(12) United States Patent
Tanaka et al.

(10) Patent No.: US 7,105,196 B2
(45) Date of Patent: Sep. 12, 2006

(54) SOYBEAN CEREAL AND METHOD FOR MAKING SAME FROM SOYBEAN FLAKES

(75) Inventors: Itaru "Terry" Tanaka, West Des Moines, IA (US); Mark P. Conlon, Granger, IN (US)

(73) Assignee: MicroSoy Corporation, Jefferson, IA (US)

( * ) Notice: Subject to any disclaimer, the term of this patent is extended or adjusted under 35 U.S.C. 154(b) by 314 days.

(21) Appl. No.: 10/383,105

(22) Filed: Mar. 6, 2003

(65) Prior Publication Data

US 2004/0175484 A1    Sep. 9, 2004

(51) Int. Cl.
*A23L 1/20*        (2006.01)
(52) U.S. Cl. ........................ 426/634; 426/431
(58) Field of Classification Search ................ 426/634, 426/431
See application file for complete search history.

(56) References Cited

U.S. PATENT DOCUMENTS

| | | | |
|---|---|---|---|
| 2,130,087 A * | 9/1938 | Hasbrouck ................. 426/457 |
| 2,182,175 A * | 12/1939 | Gates ......................... 426/550 |
| 2,421,216 A * | 5/1947 | Penty ......................... 426/621 |
| 2,421,217 A * | 5/1947 | Penty ......................... 426/620 |
| 2,436,519 A * | 2/1948 | Luke ........................... 426/621 |
| 2,478,438 A * | 8/1949 | Thompson et al. .......... 426/285 |
| 2,795,502 A * | 6/1957 | Raymond .................... 426/46 |
| 3,290,155 A | 12/1966 | Mustakas |
| 3,852,491 A | 12/1974 | Malzahn |
| 3,920,852 A * | 11/1975 | Haas ............................ 426/62 |
| 4,097,613 A | 6/1978 | DeLauder |
| 4,514,426 A * | 4/1985 | Jordan et al. ............... 426/113 |
| 4,748,038 A | 5/1988 | Lewis |
| 4,779,523 A * | 10/1988 | Hiroshima ................... 99/404 |
| 4,810,513 A | 3/1989 | Van Liere |
| 4,895,730 A | 1/1990 | Chikarashi |
| 5,188,860 A * | 2/1993 | Hemann et al. ............ 426/560 |
| 5,866,192 A | 2/1999 | Uesugi |
| 6,242,033 B1 | 6/2001 | Sander |
| 6,303,177 B1 * | 10/2001 | Ning et al. .................. 426/620 |
| 6,372,782 B1 | 4/2002 | Patel |
| 6,426,111 B1 | 7/2002 | Hirsch |
| 6,495,140 B1 | 12/2002 | Collins |

FOREIGN PATENT DOCUMENTS

| | | | |
|---|---|---|---|
| CA | 979276 | | 12/1975 |
| EP | 1132010 | * | 9/2001 |
| JP | 53-26340 | * | 3/1978 |
| JP | 1-179661 | * | 7/1989 |
| JP | 1-179670 | * | 7/1989 |
| JP | 4-158754 | * | 6/1992 |
| JP | 2002-262804 | * | 9/2002 |
| JP | 2003-180515 | * | 7/2003 |

* cited by examiner

*Primary Examiner*—Anthony Weier
(74) *Attorney, Agent, or Firm*—Sturm & Fix LLP

(57) ABSTRACT

The invention relates to a soybean cereal having excellent nutritional, taste and texture properties; and method of making said soybean cereal from full fat, enzyme active soybean flakes made from mechanically dehulled soybeans.

8 Claims, No Drawings

SOYBEAN CEREAL AND METHOD FOR MAKING SAME FROM SOYBEAN FLAKES

FIELD OF THE INVENTION

This invention relates to a soybean cereal containing a nutritionally valuable amount of soy protein and exhibiting excellent nutritional, taste and texture properties. This invention also relates to method from preparing said soybean cereal from full fat, enzyme active soybean flakes made from mechanically dehulled soybeans. Hilum soybean variety is preferred in boiling water technique; and triple null soybean variety are preferred in the microwave method.

BACKGROUND OF THE INVENTION AND RELATED ART

Soybeans have long been a staple of the Asian diet in multiple food forms including tofu and soymilk, among many other soy based and fermented foods. Soybeans are excellent sources of protein. Enzyme active soy protein, i.e., soy protein which has not been denatured, has a desirable amino acid profile for nutritional purposes, and includes other health promoting elements such as phytoestrogens. In recent years, demand for soy foods has grown dramatically in the United States and other western countries, principally in the form of meat analogs, nutrition bars and powdered nutrition beverages prepared from soy protein isolates and concentrates. Chemically fractionated soy ingredients and soymilk are prepared by modernized methods to reduce much of the traditional "beany" flavor favored in the East, but severely objected to in the West.

Demand for natural and organic foods has grown at extraordinary rates. Natural and organic foods generally cannot utilize chemically processed materials. The soy ingredients commonly used are not full fat/oil and have been treated with solvents such as hexane to remove the fat/oil fraction, and would not thus qualify as natural or organic food materials. Such isolates and concentrates are commonly further processed with water and alcohol to remove both soluble and insoluble carbohydrates to produce soy protein isolates (minimum 90% protein, dry basis). Or, just the soluble carbohydrate fraction is removed to produce soy protein concentrates (about 70% protein). The terms fats and oils are used interchangeably with respect to soybeans in the prior art and in this application. The soybean flakes used in the present invention are full fat and enzyme active made from mechanically dehulled and processed full fat, enzyme active soybeans. Hilum varieties soybeans are useful in making the soybean flakes used in the boiling water method of the present invention. Triple null soybean variety is preferred and critical in the microwave method of the present invention. Where the soybeans used in making the flakes are full fat, enzyme active, and mechanically dehulled and processed, the flakes and cereal prepared therefrom would qualify as natural food. Where prepared from organically grown soybeans, the flakes and cereal would also qualify as organic. The defatted concentrates and isolates commonly used do not qualify as natural or organic, as has become increasingly popular in today's market. U.S. Pat. Nos. 6,495,140 and 6,426,111, for example, illustrate preparation of soy fractionates and/or isolates using solvent extraction.

While the soybean flakes used in the present invention may be made by other methods, they are preferably made according to the method recited in U.S. Pat. No. 4,895,730, which patent is incorporated herein by reference.

Soybeans are excellent sources of elements necessary for good health, and supply outstanding nutritional and nutraceutical benefits. Products containing soy are excellent sources of protein, iron, vitamin-B, calcium, lecithin and isoflavones. In particular, its lecithin content is from 2.7 to 3.1 percent. Soybeans also contain essential minerals including phosphorus, which is an essential element used by the body for building bones. Soy isoflavones are now considered helpful in reducing risks for cancer, heart disease, and osteoporosis. Pure soya contains about 38–42%, 18–22% fat or oil (of this lecithin is 2.7–3.1%), 25–35% carbohydrate, 1.5–2.5% minerals, 3–5% fiber, and 5–6% water. Full soya flour furnishes about 89 grams of protein per 1000 calories, i.e., about 132 grams of protein and 44 grams oil per 1000 grams. By contrast potatoes contain only about 21 grams of protein per 1,000 calories. Full soya flour contains about three times the grams of protein per 1000 grams as lean beef. A "typical analysis of soy flour and grits appears in "*The Soybean Digest*", Vol. 19, No. 8, Jun. 1959, pages 8 to 9, as follows:

|  | Full fat | High fat | Low fat | Defatted |
|---|---|---|---|---|
| Protein, % | 40.0 | 45.0 | 48.0 | 52.0 |
| Fat, % | 20.0 | 15.0 | 5.0 | 0.5 |
| Fiber, % | 2.5 | 2.5 | 3.0 | 3.0 |
| Ash, % | 5.0 | 5.0 | 5.5 | 6.5 |
| Moisture, % | 8.0 | 8.0 | 8.0 | 8.0 |

MicroSoy full fat, enzyme active soybean flakes contain about 40.48% protein, 19.0% crude fat, 2.1% fiber, 4.79% ash, 8.08% moisture, and 27.59% carbohydrate. In addition, since soybeans do not contain particular glutens, products made from soy offer an alternative for people suffering from celiac disease and/or gluten allergies.

There exists in the prior art the need for soy-containing products made from natural unchemically processed soybean material; and having the highest possible soy content, while maintaining good taste and texture. Applicants and the prior art faced the problem that unfortunately products containing soybeans, especially in substantial amounts, tend to exhibit undesirable taste and/or texture properties. For Example, products containing soy materials, may exhibit unpleasant characteristics including chalkiness and/or mouth dryness, grittiness, grassy flavor, bitter flavor, salty flavor, and astringency. Primarily as a result of said flavor and texture problems, soybeans have been used in the hot and cold cereal market almost exclusively as additives to grain cereals in the form of soy concentrates and isolates. Limited quantities of soy materials have been added as a protein supplement to cereals made from other grains such as corn, wheat and rice. Soy isolates and concentrates are expensive forms of protein, prone to flavor problems, available mainly in powder form, and do not qualify as natural or organic food stuffs.

Additionally, a normal serving of applicants' inventive cereal, which is prepared from full fat, enzyme active, dehulled soybean flakes, meets the FDA cardiovascular health claim minimum of 6.25 grams of soy protein. According to the FDA, 25 grams of soy protein per day, when consumed as part of a diet low in saturated fat and cholesterol may reduce risk of heart disease. Moreover, the presently inventive cereal should be able to deliver the full 25 grams of soy protein in a single serving of a good tasting quality hot cereal.

Furthermore, the use of soybeans as flakes, provides significant advantages over use of soybean materials which have been further processed into granules or powder. The milling of the flakes into granules or powder increases the surface area of the soybean material, and adversely subjects the soybean material to denaturing additional heat and exposure to oxygen and moisture. Soy flours and powders have significant texture and processing problems (too powdery) and potential flavor problems as a result of milling.

Soy flakes and soy protein isolates or concentrates have been used, as illustrated in U.S. Pat. No. 6,372,782, to make soy-protein-based, liquid nutritional products, wherein the protein source is chosen from soy flakes, soy protein isolate or concentrate, hydrolyzed soy protein, soy flour, soy protein flour, soy whey, and mixtures thereof (note claims 1 and 4, for example). U.S. Pat. No. 4,895,730 discloses using soybean flakes for making soybean milk. The method for making soybean flakes shown in the '730 patent is the preferred method for making soybean flakes used in the present invention.

U.S. Pat. No. 6,303,177 shows a breakfast cereal containing at least one cereal grain selected from corn, wheat, rye, rice, oats, barley, and mixtures thereof; and, a soy material selected from soy flour, soy grits, soy flakes, a comminuted whole soybean material, or combinations thereof. The cereal grain and soy materials are taught to be blended, cooked to form a cereal dough, and the dough further processed to form a flaked, puffed or shredded ready-to-eat cereal.

U.S. Pat. No. 5,866,192 discloses an edible soy material containing soybean cell walls. The soy material is produced by providing dehulled and hypocotyl-removed soybeans without substantial swelling by water absorption; soaking and heating the soybeans in hot water to which an alkali has been added; and then crushing the soybeans. The edible soy material produced is disclosed to be used similarly to bean jam, mashed potato, hard-boiled egg yolk and the like, and also for gelation (5th paragraph in "Description of the Related Art"). The soaking temperature is taught to be 80° C. or higher, preferably, 85° C. or higher (6th paragraph of "Detailed Description of the Invention). U.S. Pat. No. 4,810,513 discloses producing a full fat, flaked soybean product to be used as cattle feed. The soybeans are not dehulled. The raw soybeans with hulls intact are subjected to steaming at temperatures greater than 100° C., followed by flaking in a roller mill. The flaked soybeans are dried in a forced air dryer by the application of superheated air at temperatures in excess of 300° F. (149° C.), and cooled to ambient temperature. U.S. Pat. No. 4,748,038 discloses a method of producing a bland tasting full fat soy flour meal or grits, wherein the soybeans either whole or split are treated with live steam or water under atmospheric pressure at temperatures ranging between 85 to 100° C. apparently 21 times for 2 to 20 minutes, or for an equal or shorter time under steam pressure in excess of atmospheric pressure. The patent indicates (6th paragraph in "Description"), "If whole soybeans are simply ground to a meal or flour, the flavour is objectionable being described as 'green', 'painty' and 'raw'(;) such flavours being a consequence of the enzymatic activity in the full-fat soy flour so prepared." U.S. Pat. No. 3,290,155 describes a process for producing a full-fat soy flour using dehulled full fat soybean flakes or grits as raw material. The flakes or grits are subjected to screw-type extrusion in which the soy material is heated to 115 to 145° C. under a dynamic pressure of 375 to 400 psi, so as to expel from the soybean flakes as much soybean oil as can be reabsorbed by the flakes upon release from the pressure zone.

U.S. Pat. No. 4,097,613 discloses a protein fortified (above about 20%), natural cereal product which comprises a mixture of whole farinaceous grains (rich in or consisting of starch), such as whole wheat, whole oats rolled oats and flaked wheat; flavorants; sweeteners; and a textured vegetable protein material derived at least in part from peanuts. Peanuts are taught to provide a "nutty" taste "generally more recognized and acceptable to humans than is the more 'beany' flavor of soybeans" (2nd paragraph of "SUMMARY OF THE INVENTION"). Also discussed (paragraph 7 of "SUMMARY OF THE INVENTION") is the inclusion in many breakfast cereal products of protein sources including defatted soybean flakes, or soybean isolates. Canadian patent 972,276 relates to debittering soy products and eliminating the undesirable bitter or beany flavor of soy. This patent indicates it is known in the art to incorporate soy flour, soy protein isolates, soy grits, soy flakes, soy meal and the like, into foods such as ready-to-eat and other breakfast cereals, but which also include cereal grains such as corn, rice, wheat, barley and the like, etc. (paragraph bridging pages 1 and 2). Also, disclosed is use of soy materials in bread formulations, cake flour, soup and gravy mixes, cookie, pancake, doughnut and waffle mixes and meat loaf. The patent notes, however, that the amount of soy that can be incorporated in a given food is limited by the natural soybean flavor that may be characterized as bitter or beany. The patent teaches reducing these flavors by incorporating as flavor controller, caramelized malt, Munich malt, or other high flavor malt. The patent teaches adding the soy material at a level of 0.5 to 30%; preferably adding 15 to 25% concentrated soy for breakfast cereal formulations.

The *Soybean Digest*, June 1959, pp. 8–9, broadly indicates edible soy products are useful additives in a variety of food products including bread and other bakery products of all types, hot and cold breakfast cereals, macaroni and spaghetti, doughnuts and doughnut mixes, cookies and crackers, and snake items. U.S. Pat. No. 6,242,033 shows preparation of an expanded cereal product from starch from a tuber such as potatoes and protein from soybeans. U.S. Pat. No. 3,852,491 shows high temperature and high pressure extrusion formation of an expanded cereal from up to 55% soy protein.

Applicants have discovered, totally unexpectedly and contrary to the teachings of the prior art, a hot cereal having good taste and texture characteristics prepared from substantially 100% full fat, enzyme active, soybean flakes made from dehulled soybeans. Hereinafter the soybean flakes made from dehulled soybeans will, for convenience, often be referred to as "full fat, enzyme active, dehulled soybean flakes". Applicants have also discovered unexpected boiling water method and microwave method for making said cereal from soybean flakes.

SUMMARY OF THE INVENTION

An object of applicants' invention is to provide a substantially 100% soybean cereal having unexpectedly good taste and texture. Another object to provide such as cereal made from full fat, enzyme active, dehulled soybean flakes. An additional object is to provide boiling water method and microwave method for making a substantially 100% soybean cereal from full fat, enzyme active, dehulled soybean flakes.

Applicants have discovered a substantially 100% soybean cereal having unexpectedly good taste and texture qualities. Applicant have also discovered unexpected boiling water method and microwave method for making said soybean cereal. Applicants' inventive soybean cereal has excellent nutritional properties, including protein content; and exhibits excellent flavor and texture characteristics. An outstanding feature of the applicants' soybean cereal is the high content of balanced proteins, containing in readily available form all of the so-called essential amino acids in proportions that insure or promote efficient utilization within the body. The boiling water method both hydrates the soybean flakes and deactivates enzymes that cause undesirable flavors typically referred to as "beany."

Unlike the cited prior art, which tend to use hulled (hull not removed), de-fatted soy materials, concentrates or isolates, applicants' invention utilizes full fat, enzyme active soybean flakes made from mechanically dehulled and processed soybeans. Conventional clear hilum soybean variety is preferred for best flavor and texture in the boiling water method of preparation of the cereal. For microwave preparation of the inventive cereal, use of triple null soybeans is critical and preferred. The dehulled, full fat, enzyme active soybean flakes used in applicants' invention provide significant advantages over soybean materials that have been processed by grinding or extruding to form granules and particularly powders. The forming into small granules and especially powders dramatically increases the surface area of the soybean material exposed to oxygen and moisture, and adversely subjects the soybean material to denaturing heat and exposure to oxygen and moisture during processing. The exposure and additional heating lead to degradation of the soybean material, especially denaturing of the proteins, and off-flavors. Soy flours and powders have significant texture and handling problems, and potential flavor problems as the result of milling.

The full fat, enzyme active, dehulled soybean flakes useful in applicants' invention can be prepared by methods known in the prior art. Especially preferred are soybean flakes made substantially in accordance with the method set forth in U.S. Pat. No. 4,895,730, which patent is incorporated herein by reference. As disclosed in this patent, the soybean flakes are prepared by (1) brushing the soybeans to remove earth matter and earth born germs; (2) adjusting the water content to facilitate separation of the skin portion; (3) separating the skin portion from the flesh portion, while simultaneously dividing the flesh portion of each soybean into four to eight parts; and, (4) passing the soybean granules thus obtained through flat-pressing rollers, whereby a product in the form of a mass of uniformly distributed, dehulled, full fat, enzyme active soybean flakes is obtained. The soybean flakes have a thickness of about 0.2 mm., or less, and long storage capability. The heat resistant earth-born germs and sporal germs are completely removed during the brushing and dehulling or skinning of the soybeans, which germs are not removed by conventional steps of washing. The soybean flakes prepared in accordance with the method set forth in the '730 patent, and foodstuffs prepared therefrom, are thus rendered less perishable and highly wholesome. Soybean flakes prepared according to '730 patent are especially useful in the present invention. While numerous varieties of soybeans are available, the clear hilum soybean variety is preferred for the boiling water method of preparing applicants' inventive cereal. Triple null soybean variety is especially preferred and critical for use in the cereal preparation method using microwave. Null refers to soybeans wherein the lipoxygenase enzymes has been bred out of the soybean. Triple-null refers to soybeans which are essentially free of the native lipoxygenase enzyme that causes an unpleasant and generally undesired flavor in soy foods.

DETAILED DESCRIPTION OF THE INVENTION

Applicants have invented a substantially 100% soybean cereal made from full fat, enzyme active soybean flakes made from mechanically dehulled and processed soybeans. The soybean flakes used in the boiling water method of making applicants' cereal are made preferably from clear hilum soybean variety. Soybean flakes made from triple null variety soybean are preferred and critical in the inventive microwave method of making applicants' cereal. Applicants have invented a boiling water method and a microwave method for making the soybean cereal from said soybean flakes.

The full fat, enzyme active soybean flakes used in the present invention are made from full fat, enzyme active (undenatured), dehulled soybeans. While the soybean flakes may be made by a variety of processes known in the prior art, it is advantageous that the soybeans be mechanically dehulled and processed. The temperature of the soybeans material during processing to flakes should be maintained no higher than 55° C., and more preferably no higher than 50° C. Higher temperatures lead to denaturing of the soybean material, and off flavors. Especially preferred soybean flakes for use in the present invention are made by the method disclosed in U.S. Pat. No. 4,895,730, which patent has incorporated herein by reference.

Full fat, enzyme active soybean flakes prepared from mechanically dehulled and processed soybeans by the method disclosed in the '730 patent are available from MicroSoy Corporation in Jefferson, Iowa, marketed under the trademark MicroSoy Flakes. MicroSoy Corporation has a main office and plant in Jefferson, Iowa. According to the method disclosed in the '730 patent, full fat, enzyme active soybean flakes are prepared by subjecting soybeans to brushing and dehulling or skinning, such that earth-born germs and sporal germs are completely removed, including those which are heat resistant and those which cannot be removed by the conventional step of washing the material soybean in water. The flakes and food stuffs made therefrom are rendered less perishable and highly wholesome. The processing of the soybeans in the patent includes, after the brushing step, a step of adjusting the water content of the soybeans to facilitate separation of the skin portion of the soybean from the flesh portion thereof. The soybean is then separated into skin portion and flesh portion, and simultaneously the flesh portion of each piece of soybean is divided into four to eight parts. The soybean granules thus obtained are passed through flat-pressing rollers, whereby a product in the form of a mass of uniformly distributed flakes results. The adjustment of water content of the soybean facilitates skin/flesh separation and also dries the flesh, so that a product having a low moisture content and good storage stability can be obtained when the flesh is reduced to flakes. Said water content adjustment is carried out such that the temperature of the soybean material does not exceed temperatures which will not cause thermal denaturing of the soy protein. The temperature of the soybean material does not exceed 55° C.; and more preferably 50° C. "Full fat" refers to soybean flakes where no fat has been removed, except that very small amount lost during washing and dehulling.

Many suitable varieties of soybeans are available, including yellow and/or clear variety hilum soybeans. Use of black hilum soybeans is less desirable due to the carry over of color into the inventive composition and inventive product, which some find less aesthetic or appetizing. Also, available are single, double or triple null soybean varieties. Triple-null soybeans are bred to be essentially free of the native lipoxygenase enzyme that causes an unpleasant and generally undesired flavor in soy foods. Soybean flakes made from clear hilum soybean variety are preferred for the boiling water method of making the inventive cereal. Soybean flakes made from triple null soybean variety are most useful and critical in the method of making applicants' cereal using microwave.

Applicants have also discovered that the use of soybean flakes provides an unexpected difference in the flavor and texture perception of the cereal product made therefrom, as compared with the use of soy granules or powder. During preparation of soybean granules and especially powder, the surface area of the soybean material is increased, with consequent increased degradative exposure to oxygen, moisture, and additional heating during grinding. Soy flour and powder have significant textural and handling problems, and potential flavor problems as the result of milling. Moreover, the cereal of the present invention, which is prepared from full fat, enzyme active flakes made from mechanically dehulled and processed soybeans, qualifies as "natural", and is free from "harmful" additives. When the soybeans qualify as organically grown, applicants' soybean cereal would likewise qualify as "organic".

The inventive cereal is prepared, in the boiling water method, by placing the soybean flakes in a filter or holding means which is readily permeable to water, but retains the flakes during cooking. Said holding means must be such that it retains the flakes, while permitting water to freely pass therethrough into contact with the flakes. The holding means containing the flakes is immersed in boiling or near boiling water for a time sufficient to form the soybean cereal, e.g., about 5 to 10 minutes, preferably about 10 minutes. The holding means is removed from the water and the soybean cereal emptied in the a container suitable for serving. Soy or dairy milk is normally added to the cereal. Traditional hot cereal flavorings (e.g., cinnamon, maple syrup, fruit, honey, etc.) may also be added.

An illustrative example of a boiling water method of preparing the inventive soybean cereal includes the following steps (illustrative amounts and times are included):

The invention claimed is:

1. A method of making a soybean cereal comprising the following steps:
   A. placing full fat, enzyme active, dehulled soybean flakes in a water permeable container;
   B. placing the water permeable container holding the flakes in boiling or near boiling water:
   C. leaving the water permeable container holding the flakes in the water until cooked into cereal;
   D. removing the water permeable container containing the cereal from the water;
   E. opening the water permeable container; and
   F. removing the cereal from the opened water permeable container and placing the cereal into a suitable serving receptacle.

2. The method of claim 1 including the additional step of adding milk selected from soymilk and dairy milk to the cereal.

3. The method of claim 1 including the additional step of adding a sweetener to the cereal.

4. The method of claim 1 including the additional step of adding flavoring to the cereal.

5. The method of claim 1 wherein the soybean flakes are made from clear hilum soybean variety.

6. The method of claim 1 wherein the soybean flakes are made substantially by the method set forth in U.S. Pat. No. 4,895,730.

7. The method of claim 1 wherein the water permeable container containing the soybean flakes is left in the water for about five to ten minutes.

8. The method of claim 1 wherein the water permeable container containing the soybean flakes is left in the water for about ten minutes.

* * * * *